W. HAGERTY.

STOVE GRATE.

No. 9,841. Reissued Aug. 16, 1881.

WITNESSES:

Fred F. Schurch.

INVENTOR;

William Hagerty,
by Hill & Church
Her attys.

N. PETERS, Photo-Lithographer, Washington, D. C.

UNITED STATES PATENT OFFICE.

WILLIAM HAGERTY, OF PHILADELPHIA, PENNSYLVANIA.

STOVE-GRATE.

SPECIFICATION forming part of Reissued Letters Patent No. 9,841, dated August 16, 1881.

Original No. 145,172, dated December 2, 1873. Application for reissue filed June 18, 1881.

*To all whom it may concern:*

Be it known that I, WILLIAM HAGERTY, of the city and county of Philadelphia, and State of Pennsylvania, have invented certain new and useful Improvements in Stove-Grates; and I do hereby declare the following to be a full and exact description of the same, reference being had to the accompanying drawings, forming part of this specification, in which—

Figure 1:
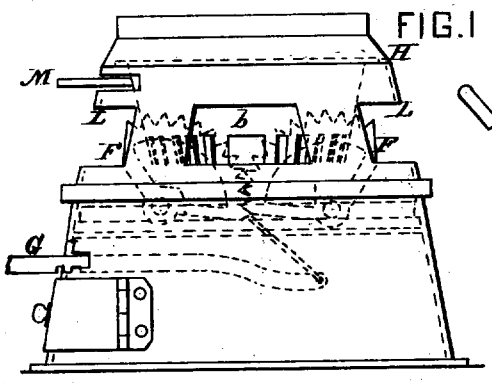
Figure 4:
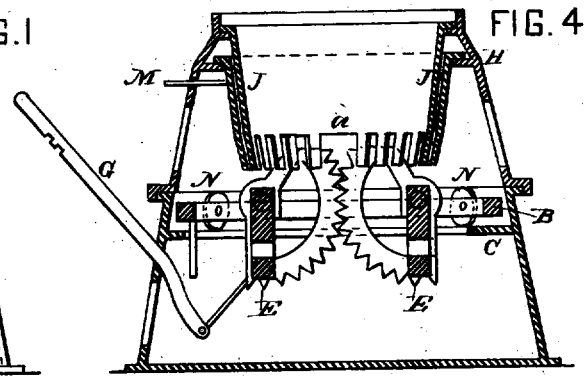
Figure 2:
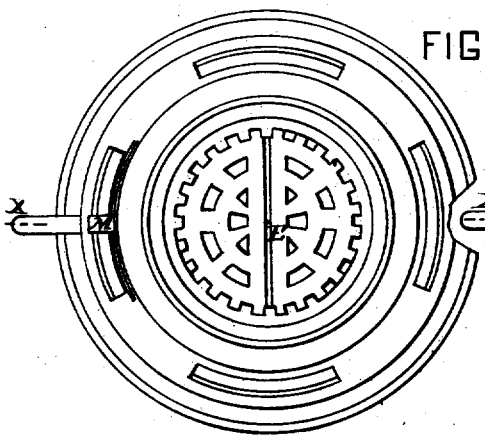
Figure 5:
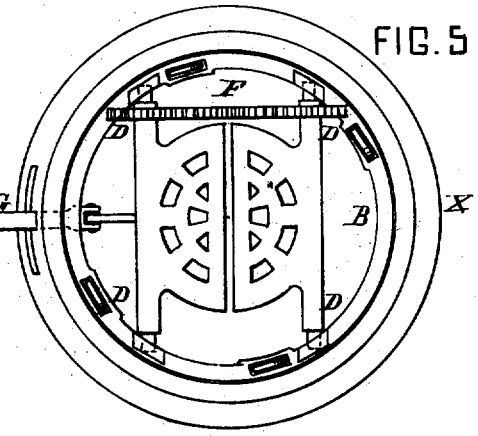
Figure 3:
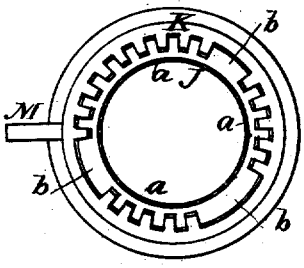
Figure 6:
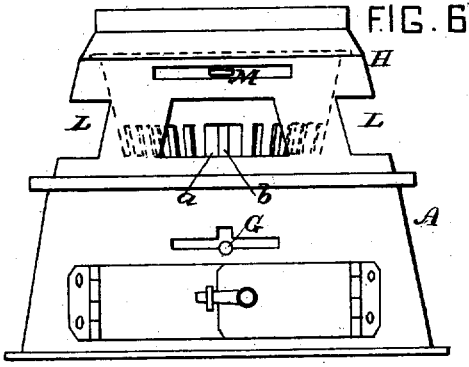

Figure 1 represents the side elevation of a structure embodying my invention; Fig. 2, a top-plan view of the same; Fig. 3, a bottom-plan view of the fire-pot and the rotating grate encircling it; Fig. 4, a vertical central section taken on line *x x*, Fig. 2. Fig. 5 is a top-plan view with the fire pot removed, and Fig. 6 is a front elevation.

Similar letters of reference in the several figures indicate the same parts.

This invention relates to that class of stove-grates in which the grate proper is adapted to normally support the fuel in the fire-pot of the stove, but can be dumped or swung on its bearings at will, so as to discharge the contents of the fire-pot into the ash-pit below.

The invention has for its object to improve, in several respects, the construction and operation of grates of such class; and to this end it consists, primarily, of a grate so divided centrally into two parts or sections that neither section shall project beyond the dividing-line, the said sections being mounted upon separate axes, and geared together so as to be opened and closed simultaneously.

It further consists in arranging the gearing by which the grate-sections are simultaneously operated within the casing of the stove, but outside of the fire-pot.

It further consists in mounting the sectional grate and operating-gearing on a rotating ring.

It further consists in the employment of a lever or rod for supporting the grate when closed, and for rotating it.

It further consists of a fire-pot of peculiar construction, and a rotating grating combined therewith, whereby to permit the removal of the clinkers, &c., without disturbing the grate proper; and it further consists in the provision of windows or openings in the casing surrounding the fire-pot and rotating grating, for the purpose of permitting access to the latter.

Referring to the drawings, A represents the base or ash-pit of a stove.

B represents a band or ring, which is arranged within the ash-pit, and supported on a ledge, C, suitably elevated above the bottom of said pit. On this band there are journaled the parallel axes D of a two-part or sectional grate, E, which consists of a grate divided centrally, and having the axes or journals D on the outside of the sections, so that the central portions of the sections may advance toward or recede from each other.

F represents two vertically-arranged toothed segments, which mesh with each other and are respectively secured to the axes D of the grate, at one side thereof, so as not to interfere with the portions of the stove above the grate. These segments, being within the outer casing, are fully protected, and are not in danger of being broken in transportation or by anything striking against them or by coming in contact with them at any time. Moreover, they are not accessible to children, and do not catch or tear the clothes of persons passing, nor do they mar the beauty or symmetry of the stove, as they would if on the outside of the casing.

An operating lever or rod, G, is jointed to one of the sections of the grate, and extends to the front of the stove through a slot in the walls of the ash-pit, so as to be conveniently reached and handled. A notch or notches or other fastening is formed in or provided upon the lever, in order to lock the same, and thus hold the two parts of the grate in proper position when in use.

It will be seen that by releasing the lever G the two sections of the grate are in nowise held up, and at once separate and allow the fire, ashes, or cinders, as the case may be, to drop centrally into the ash-pit, or pan therein, and this without any interference of the grate, the latter, as well as the axes D, being entirely out of the way and permitting a free discharge.

It is evident that motion imparted to one section of the grate will be communicated by the segmental gearing to the other section, and thus the two sections will be opened simultaneously. When it is desired to close the grate the lever G is forced forward, so as to elevate one section of the grate. This movement is communicated to the segment of said section, which operates the segment of the other section, and thus raises the latter section, the operation of both sections being simultaneous. The lever will then be locked or properly engaged, and the grate is held in horizontal position. When the notch of the lever rests on the edge of the slot through which it projects the grate is readily raked, by reciprocating the lever, without danger of disengagement of the grate.

A number of rollers or wheels, N, will be mounted on the band B and run on the ledge C, for causing easy motion of the band, and lessening friction between said band and the ledge.

The fire-pot J is suspended within the portion H of the stove-casing, and comes close to the horizontal grate E. Some of the pieces constituting the fire-pot are cut away, as at *a*, at diametrically-opposite points, in order to afford means of access to clinkers, &c., in the fire-chamber. A rotating grating, K, encircles the fire-pot J, and is constructed to coincide with said fire-pot, so that when turned in one direction the cut-away parts *a b* will register, and when turned in the opposite direction the teeth or pieces constituting the grating K will cover or surround the cut-away pieces of the fire-pot, whereby, in the latter case, the parts J and K form a continuous circular grating and properly retain the burning mass, and in the former case the exposed places or cut-away parts permit the removal of the clinkers, slate, &c., as has been stated, through windows or openings L, made in the walls of the part H of the stove, as shown. A lever or rod, M, is attached to the revolving part K, and projects from the part H or some other convenient point.

It will be seen that when the cut-away parts of the fire-pot J and encircling-grating K are to register the grating may be rotated without disturbing the grate proper, and that when the latter is being raked or shaken the encircling-grating is not disturbed or the cut-away parts uncovered.

I am aware that a grate has heretofore been constructed consisting of two grate-sections hinged at their outer edges on parallel axes, and combined with a transverse crank-arm adapted, when turned up, to bear against the under sides of the sections and lift the latter into horizontal position, and when turned down to permit said sections to swing down or dump by gravity; but in such grate, as there is no positive action of the sections in dumping, gravity alone being depended upon, either or both sections are liable to be caught and held when the crank-arm is turned down. In my invention, however, the grate-sections being geared together by positive gearing, both sections are simultaneously and positively operated both in dumping and raising the grate, and gravity is not relied upon to perform either operation.

Having thus described my invention, what I claim as new, and desire to secure by Letters Patent, is—

1. A stove-grate so divided centrally into two parts or sections that neither section shall project beyond the dividing-line, the said sections being mounted upon separate axes, and geared together so as to be opened and closed simultaneously and positively, substantially as described.

2. The combination, with a stove-grate constructed of two parts or sections mounted upon separate axes or journals, of gearing for simultaneously operating the said sections arranged within the casing of the stove, but outside of the fire-pot, substantially as described, for the purpose specified.

3. The sectional grate E and connecting-gearing F, mounted on the rotating ring B, substantially as and for the purpose set forth.

4. The combination, with the grate E and gearing F, and the rotating ring B, supporting said grate and gearing, of the lever G, jointed to the grate and projecting through the base A of the stove, substantially as and for the purpose set forth.

5. The combination, with the fire-pot J, of the grating K, adapted to rotate independently of the grate proper, and operated by the rod M, the parts J K having cut-away portions *a b* respectively, as herein set forth, and for the purpose described.

6. The combination, with the fire-pot J and rotating grating K, of the windows or openings L, encircling the parts J K, in relation to the cut-away portions *a b* of the parts J K, substantially as and for the purpose described.

WM. HAGERTY.

Witnesses:
JOHN J. JACK,
J. W. COBB.